United States Patent
Mueller-Hagen et al.

[11] Patent Number: 5,453,480
[45] Date of Patent: Sep. 26, 1995

[54] POLYETHERESTEROLS, THEIR PREPARATION, AND THEIR USE IN POLYURETHANES

[75] Inventors: Gerd Mueller-Hagen, Ludwigshafen; Horst Heinrich, Ruhland; Baerbel Meyer, Lauta, all of Germany

[73] Assignee: BASF Schwarzheide GmbH, Germany

[21] Appl. No.: 143,032

[22] Filed: Oct. 29, 1993

[30] Foreign Application Priority Data

Dec. 9, 1992 [DE] Germany .......... 42 41 415.6

[51] Int. Cl.⁶ .................................. C08G 63/66
[52] U.S. Cl. ............ 528/301; 528/272; 528/296; 528/302
[58] Field of Search ............... 528/301, 272, 528/296, 302

[56] References Cited

U.S. PATENT DOCUMENTS

| | | | |
|---|---|---|---|
| 4,605,729 | 8/1986 | Barnes | 528/301 |
| 5,112,940 | 5/1992 | Korte | 528/301 |

Primary Examiner—José G. Dees
Assistant Examiner—Samuel Barts
Attorney, Agent, or Firm—Dennis V. Carmen

[57] ABSTRACT

The invention relates to polyetheresterols obtained by condensation of a polyfunctional carboxylic acid with an alcohol component, wherein the alcohol component comprises a mixture of alkanediols and etherdiols of the formula

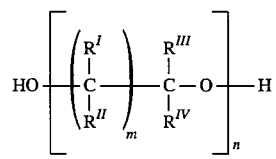

where
m=1 to 3
n≧3 and
$R^I$, $R^{II}$, $R^{III}$ and $R^{IV}$ are identical or different and, independently of one another, are hydrogen or $C_1$- to $C_4$-alkyl, and the ratio between ether and ester groups in the polyetheresterol is in the range from 0.3:1 to 1.5:1, which are suitable, in particular, for the preparation of polyurethanes having reduced fogging.

12 Claims, No Drawings

POLYETHERESTEROLS, THEIR PREPARATION, AND THEIR USE IN POLYURETHANES

The invention relates to polyetheresterols, to a process for their preparation, and to their use for the preparation of polyurethane plastics.

Polyetheresterols play an important role in polyurethane chemistry. Their preparation, usually by polycondensation, and their use for the preparation of polyurethane plastics have been known for some time and have been described many times.

Polyesterols containing ether groups are predominantly prepared, according to the prior art, by batch processes in which a dicarboxylic acid and a polyfunctional alcohol containing ether groups are reacted, usually at >150° C. under reduced pressure and in the presence of catalysts with removal of the condensate, until the polyetheresterols of the desired hydroxyl number and minimal acid number are formed.

Thus, for example according to DD-A 113 923, low-viscosity polyetheresterols can also be prepared by esterifying polyetherols, which are condensed as intermediates from diols or polyols in the presence of acidic etherification catalysts, by means of di- or polycarboxylic acids.

A further way of preparing polyetheresterols is to react OH-functional polyethers with epoxidized natural fats and oils in the presence of catalysts. Other possible processes are the reaction of polycarboxylic acids with alkylene oxides and alkoxylation of polyesterols.

The use of polyetheresterols in the preparation of polyurethanes proves to be advantageous in many cases compared with the use of pure polyetherols or pure polyesterols, since polyetheresterols combine the advantageous properties of polyetherols, such as good processing properties due to low viscosity, and good hydrolysis resistance of the resultant polyurethanes, with those of polyesterols, such as good oxidation and solvent resistance, good sound absorption and good hardness properties of the resultant polyurethanes, and on the other hand compatibility problems, which occur when polyetherols and polyesterols are employed simultaneously, are avoided.

Polyetheresterols, usually those based on dicarboxylic acids, preferably adipic acid and phthalic acid, and polyhydric alcohols containing ether groups, such as diethylene glycol and dipropylene glycol, are therefore employed in large amounts for the preparation of polyurethanes.

Of the polyetheresterols used, products in which the ratio between ether and ester groups is approximately 1:2 are particularly important. The polyetheresterols built up in this way have an optimum property profile, in particular when these products are used in flexible polyurethane foams. These products are prepared on a large industrial scale by, in particular, the esterification of diethylene glycol and/or dipropylene glycol by means of dicarboxylic acids.

The polyurethanes prepared from polyetheresterols of this type have the disadvantage of a fogging effect, which is taken to mean the release of volatile compounds from plastics. This is particularly noticeable in automobile production if the windows fog due to releases from polyurethanes in the interior trim.

The known polyetheresterols have the same disadvantages here as known of polyesterols within and outside polyurethane chemistry, for example when phthalic acid polyesterols or adipic acid polyesterols are used as polymer plasticizers. These products contain considerable amounts of low-molecular-weight substances, which can escape from the plastic under appropriate conditions.

For this reason, some methods have already been proposed for eliminating these low-molecular-weight substances. According to DE-A 38 11 499, the low-molecular-weight components are removed by steam treatment of the polyesterols at 150° C. for at least 15 hours.

Also known is the removal of low-molecular-weight compounds from polyols by reduced-pressure treatment at about 160° C., if desired using a thin-film evaporator, or extraction of the low-molecular-weight components from the polyol by means of organic solvents. However, these methods are too complex for the large-scale production of polyols. Their use in industry would result in the principal advantage of polyetheresterols, their universal applicability, no longer being brought to bear for cost reasons.

It is an object of the present invention to develop polyetheresterols which are prepared by a simple process and can be converted into plastics having reduced fogging.

We have found that this object is achieved by polyetheresterols having a defined ratio between ether and ester groups, and which are built up from polyfunctional carboxylic acids and a mixture of alkanediols and specific ether diols as the alcohol component.

The present invention accordingly provides polyetheresterols having a defined ratio between ether and ester groups, as obtained by condensation of a polyfunctional carboxylic acid with an alcohol component containing ether groups, wherein the alcohol component is a mixture of alkanediols and etherdiols of the formula

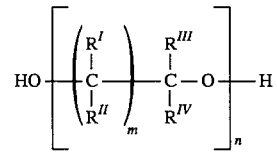

where
m=1 to 3
n≧3 and
$R^I$ to $R^{IV}$, independently of one another, are identical or different and are hydrogen or $C_1$- to $C_4$-alkyl,
and the ratio between ether and ester groups in the polyetheresterol is in the range from 0.2:1 to 1.5:1.

The present invention furthermore provides a process for the preparation of polyetheresterols having a defined ratio between ether and ester groups, by condensing a polyfunctional carboxylic acid with an alcohol component containing ether groups, wherein the alcohol component comprises alkanediols and etherdiols of the formula

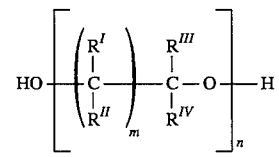

where m, n and $R^I$ to $R^{IV}$ in the formula are as defined above, and where the alkanediol:etherdiol ratio in the alcohol component is selected so that the ratio between ether and ester groups in the resultant polyetheresterol is from 0.3:1 to 1.5:1.

The present invention furthermore provides the use of the polyetheresterols according to the invention for the preparation of polyurethanes having reduced fogging.

The alkanediols employed generally have 2 to 10 carbon atoms, for example the monoglycols, conventional for the preparation of polyesterols, such as 1,4-butanediol, 1,3-butanediol, 1,6-hexanediol, and neopentyl glycol, but in particular ethylene glycol and/or propylene glycol.

The etherdiols employed are preferably tri- and/or polyethylene glycols having a molecular weight of up to 600 and/or tri- and/or polypropylene glycols having a molecular weight of up to 1000.

The acid component employed is a carboxylic acid or carboxylic anhydride conventionally used for the preparation of polyesterols, for example adipic acid, phthalic acid or phthalic anhydride.

The polyetheresterols according to the invention are generally prepared by condensing a polyfunctional carboxylic acid with the alcohol component described above in a batch process, usually at from 160° to 260° C., preferably from 220° to 240° C.

In order to improve the conversion, catalysts, preferably compounds of titanium and tin, in amounts of up to 1000 ppm can be employed, for example tetrabutyl orthotitanate, tin(II) octanoate and tin(II) chloride.

In order to improve the removal of the water formed during the esterification and readily volatile byproducts, it is advantageous to carry out the reaction under a reduced pressure in the range from 100 to 10 mbar.

In order to prepare the polyetheresterols, it is advantageous either to precondense the majority of the alkanediol employed with the acid component and to meter in the etherdiol subsequently, if desired synchronously with the formation of condensate, or vice versa.

In the preparation of the polyetheresterols according to the invention, the alcohol component, ie. the alkanediols and etherdiols, and the acid component, ie. the polyfunctional carboxylic acid, are employed in such a ratio in respect to one another that the molar ratio between the OH groups in the alcohol component and the COOH groups in the acid component is generally in the range from 1.01:1 to 2:1, preferably in the range from 1.05:1 to 1.1:1. The precise ratio between the OH groups in the alcohol component and the COOH groups in the acid component depends primarily on the desired molecular weight of the polyetheresterols. The ratio between the ether and ester groups in the polyetheresterol depends on the type of etherdiol employed, ie. the number of ether groups in the etherdiol, the proportion of etherdiol in the alcohol component, and the molar ratio between the OH groups in the alcohol component and the COOH groups in the acid component. Since essentially all the COOH groups in the polyfunctional carboxylic acid react in the condensation reaction with the alcohol component, the ratio between alkanediol and etherdiol in the alcohol component which is necessary to achieve the desired ratio between ether and ester groups in the polyetheresterols can easily be determined for a given etherdiol and molar ratio between OH groups in the alcohol component and COOH groups in the acid component.

The polyetheresterols according to the invention can be converted into polyurethanes having reduced fogging by reaction with an isocyanate component.

Suitable isocyanate components are, in particular, tolylene diisocyanate, diphenylmethane diisocyanate, isophorone diisocyanate and isocyanate group-containing reaction products of said compounds. The polyurethanes are usually prepared, depending on the desired properties of the end products, in the presence of catalysts, blowing agents and assistants. The polyetheresterols according to the invention are preferably converted into polyurethane foams. These foams are used, in particular, for interior trim in automobile production.

The fact that the object of the invention can be achieved by means of the polyetheresterols according to the invention was surprising. A person skilled in the art would inevitably have expected that, for example, replacement of diethylene glycol (n=2, B.p.=244°–247° C.) by a mixture of monoethylene glycol (n=1, B.p.=197°–199° C.) and triethylene glycol (n=3, B.p.=282°–291° C.) in the structure of the polyetheresterol would tend to increase the fogging due to the lower-boiling monoethylene glycol. However, it has been found that a significant reduction in accordance with DIN 75 201 took place.

The invention is described in greater detail by means of the examples below.

COMPARATIVE EXPERIMENT A 91 g of trimethylolpropane, 1,167 g of diethylene glycol and 1,158 g of adipic acid were esterified for four hours at from 150° to 200° C. under atmospheric pressure and under a nitrogen atmosphere in a stirred reactor fitted with a column and with temperature control and monitoring means. The reaction was then continued to an acid number of <2.0 mg of KOH/g at 240° C. and 10 mbar in the presence of 0.08 g of tetrabutyl orthotitanate.

The polyetheresterol prepared in this way had a water content of 0.02% by weight in accordance with DIN 51 777, an acid number of 0.5 mg of KOH/g in accordance with DIN 53 402, a hydroxyl number of 60.1 mg of KOH/g in accordance with DIN 53 240 and a viscosity of 1,010 mPa.s at 75° C. in accordance with DIN 53 015. This polyesterol was converted into flexible foam slabs having a density of 27 kg/m$^3$ by means of tolylene diisocyanate 80/20, a mixture comprising 80% by weight of 2,4-tolylene diisocyanate and 20% by weight of 2,6-tolylene diisocyanate, using water, foam stabilizer and activator. The proportion of condensable constituents was determined in accordance with DIN 75 201 immediately after sawing and was 6.4 mg.

EXAMPLE 1

Under the conditions given in comparative experiment A, 91 g of trimethylol propane, 342 g of monoethylene glycol, 825 g of triethylene glycol and 1,558 g of adipic acid were reacted to give a polyetheresterol having an acid number of 1.4 mg of KOH/g, a hydroxyl number of 61.2 mg of KOH/g, a water content of 0.03% by weight and a viscosity of 945 mPa.s at 75° C.

A flexible foam slab having a density of 27 kg/m$^3$ produced therefrom as in comparative experiment A contained 2.3 mg of condensable constituents in accordance with DIN 75 201 immediately after cutting.

EXAMPLE 2

Under the conditions given in comparative experiment A, 91 g of trimethylolpropane, 465 g of monoethylene glycol, 703 g of polyethylene glycol having a molecular weight of 200 and 1,558 g of adipic acid were reacted to give a polyetheresterol having an acid number of 0.67 mg of KOH/g, a hydroxyl number of 57.0 mg of KOH/g, a water content of 0.015% by weight and a viscosity of 1,050 mPa.s at 75° C.

Determination of the condensable constituents in accordance with DIN 75 201 of a flexible foam slab having a density of 27 kg/m³ produced from this polyetheresterol gave 1.5 mg.

EXAMPLE 3

Under the conditions given in comparative experiment A, 91 g of trimethylolpropane, 342 g of monoethylene glycol and 1,558 g of adipic acid were esterified. After about 100 g of condensate had been produced, 825 g of triethylene glycol were added, and the esterification was continued until an acid number of 0.92 mg of KOH/g and a hydroxyl number of 59.4 mg of KOH/g had been reached. The resultant polyetheresterol had a water content of 0.023% by weight and a viscosity of 980 mPa.s at 75° C.

A flexible foam slab having a density of 27 kg/m³ produced therefrom contained 2.4 mg of condensable constituents in accordance with DIN 75 201 immediately after sawing.

EXAMPLE 4

Under the conditions given in comparative experiment A, 91 g of trimethylolpropane, 825 g of triethylene glycol and 1,558 g of adipic acid were esterified. After about 100 g of condensate had been produced, 342 g of monoethylene glycol were metered into the reaction mixture and the esterification was continued until an acid number of 1.2 mg of KOH/g had been reached. The resultant polyetheresterol had a hydroxyl number of 61.0 mg of KOH/g, a water content of 0.017% by weight and a viscosity of 1,000 mPa.s at 75° C.

The polyetheresterol was employed to produce a flexible foam slab having a density of 27 kg/m³. Immediately after sawing, the amount of condensable constituents was determined at 2.3 mg in accordance with DIN 75 201.

COMPARATIVE EXPERIMENT B

Under the conditions given in comparative experiment A, 1,162 g of dipropylene glycol and 1,118 g of adipic acid were reacted to give a polyetheresterol having an acid number of 1.1 mg of KOH/g, a hydroxyl number of 57.5 mg of KOH/g, a water content of 0.03% by weight and a viscosity of 320 mPa.s at 75° C.

This polyetheresterol was employed in a flexible polyurethane foam for foam backing of floor mats. Immediately after sawing, this flexible foam was found to contain 10.8 mg of condensable constituents in accordance with DIN 75 201.

EXAMPLE 5

Under the conditions given in comparative experiment A, 556 g of monopropylene glycol, 608 g of polypropylene glycol having a molecular weight of 450 and 1,118 g of adipic acid were reacted to give a polyetheresterol having an acid number of 0.7 mg of KOH/g, a hydroxyl number of 53.3 mg of KOH/g, a water content of 0.02% by weight and a viscosity of 345 mPa.s at 75° C.

A flexible foam produced therefrom in accordance with comparative experiment B contained 4.5 mg of condensable constituents in accordance with DIN 75 201 immediately after sawing.

COMPARATIVE EXPERIMENT C 2,270 g of phthalic anhydride and 2,700 g of diethylene glycol were reacted under the conditions given in comparative experiment A to give a polyetheresterol having an acid number of 1.4 mg of KOH/g, a hydroxyl number of 241 mg of KOH/g, a water content of 0.02% by weight and a viscosity of 170 mPa.s at 75° C.

This was employed together with polyesterols to produce a semirigid polyurethane foam. This contained 5.5 mg of condensable constituents in accordance with DIN 75 201.

EXAMPLE 6

2,270 g of phthalic anhydride, 790 g of monoethylene glycol and 1,900 g of triethylene glycol were reacted under the conditions given in comparative experiment A to give a polyetheresterol, which was employed in place of the polyetheresterol described in comparative experiment C in the foam system described therein.

The foam produced in this way contained 2.5 mg of condensable constituents in accordance with DIN 75 201.

EXAMPLE 7

Under the conditions given in comparative experiment A, 91 g of trimethylolpropane, 125 g of monoethylene glycol, 1,350 g of triethylene glycol and 1,558 g of adipic acid were reacted to give a polyetheresterol having an acid number of 1.2 mg of KOH/g, a hydroxyl number of 60.2 mg of KOH/g, a water content of 0.012% by weight and a viscosity of 875 mPa.s at 75° C.

Determination of the condensable constituents in accordance with DIN 75 201 of a flexible foam slab having a density of 27 kg/m³ produced from this polyetheresterol gave 2.1 mg.

EXAMPLE 8

Under the conditions given in comparative experiment A, 385 g of tripropylene glycol, 610 g of monopropylene glycol and 1,315 g of adipic acid were reacted to give a polyetheresterol having an acid number of 0.75 mg of KOH/g, a hydroxyl number of 57 mg of KOH/g, a viscosity of 500 mPa.s at 75° C. and a water content of 0.018% by weight.

In a flexible foam produced from this polyetheresterol analogously to comparative experiment B, determination of the condensable constituents in accordance with DIN 75 201 immediately after sawing gave 6.5 mg.

We claim:

1. A polyetheresterol comprising the condensation product of a polyfunctional carboxylic acid with an alcohol component containing ether groups, wherein the alcohol component comprises alkanediols and ether diols of the formula

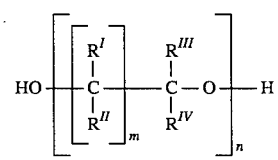

where
m=1 to 3
n≧3 and $R^I$, $R^{II}$, $R^{III}$ and $R^{IV}$ are identical or different and, independently of one another, are hydrogen or $C_1$- to $C_4$-alkyl, and the ratio between ether and ester groups in the polyetheresterol is in the range from 0.3:1 to 1.5:1, and the alkanediols and etherdiols are reacted with the polyfunctional carboxylic acid in a molar ratio of all —OH groups to —COOH groups in the range of 1.01:1 to 1.1:1.

2. A polyetheresterol as claimed in claim 1, wherein the alkanediols employed have 2 to 10 carbon atoms.

3. A polyetheresterol as claimed in claim 1 or 2, wherein the alkanediols employed are ethylene glycol and/or propylene glycol.

4. A polyetheresterol as claimed in any of claims 1 to 2, wherein the etherdiols employed are tri- and/or polyethylene glycol and/or tri- and/or polypropylene glycol.

5. A process for the preparation of a polyetheresterol comprising simultaneously condensing a polyfunctional carboxylic acid with a mixture comprising alkanediols and etherdiols; or precondensing a polyfunctional carboxylic acid with a majority of the alkanediols employed, and subsequently metering in the etherdiols, said etherdiols being of the formula

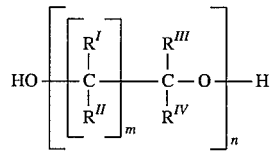

where
  m=1 to 3
  n≧3 and
  $R^I$, $R^{II}$, $R^{III}$ and $R^{IV}$ are identical or different and, independently of one another, are hydrogen or $C_1$- to $C_4$-alkyl, wherein the ratio of the ether to ester groups in the polyetheresterol ranges from 0.3:1 to 1.5:1.

6. The process of claim 5, wherein the molar ratio of total amount of —OH groups in the alkanediols and the etherdiols to the —COOH groups in the carboxylic acid is from 1.01:1 to 1.1:1.

7. The process of claim 5, wherein the alkanediol(s) have 2 to 10 carbon atoms.

8. The process of claim 7, wherein the alkanediols employed are ethylene glycol and/or propylene glycol.

9. The process of claim 5, wherein the polyetheresterol is prepared by precondensing a polyfunctional carboxylic acid with a majority of the alkanediols employed, and subsequently metering in the etherdiols.

10. The process of claim 9, wherein the molar ratio of all —OH groups in the alkanediols and etherdiols to the —COOH groups ranges from 1.01:1 to 1.1:1.

11. The process of claim 9, wherein the alkanediols have from 2 to 10 carbon atoms.

12. The process of claim 11, wherein the etherdiols employed are tri- and/or polyethylene glycol and/or tri- and/or polypropylene glycol.

* * * * *